United States Patent [19]

Yokoyama et al.

[11] Patent Number: 5,751,391
[45] Date of Patent: May 12, 1998

[54] LIQUID CRYSTAL DEVICE WITH ELONGATED PROJECTION HEIGHT SMALLER THAN LIQUID CRYSTAL THICKNESS AND PROCESS FOR PRODUCING SAME

[75] Inventors: Yuko Yokoyama, Yokohama; Masayuki Shimamune, Tokyo, both of Japan

[73] Assignee: Canon Kabushiki Kaisha, Tokyo, Japan

[21] Appl. No.: 638,193

[22] Filed: Apr. 26, 1996

[30] Foreign Application Priority Data

Apr. 27, 1995 [JP] Japan ................... 7-125645

[51] Int. Cl.[6] ............... G02F 01/1339; G02F 01/1341; G02F 01/1343
[52] U.S. Cl. .................. 349/153; 349/154; 349/189; 349/143
[58] Field of Search ............... 349/153, 154, 349/143, 189

[56] References Cited

U.S. PATENT DOCUMENTS

| | | | |
|---|---|---|---|
| 4,158,485 | 6/1979 | Mueller et al. | 349/153 |
| 4,640,583 | 2/1987 | Hoshikawa et al. | 349/153 |
| 4,974,939 | 12/1990 | Yamazaki et al. | 349/153 |
| 4,995,705 | 2/1991 | Yoshinaga et al. | 349/183 |
| 5,150,239 | 9/1992 | Watanabe et al. | 359/80 |
| 5,285,300 | 2/1994 | Suzuki et al. | 349/143 |
| 5,296,096 | 3/1994 | Enomoto et al. | 156/667 |
| 5,323,253 | 6/1994 | Iwayama et al. | 349/133 |
| 5,340,491 | 8/1994 | Enomoto et al. | 252/79.1 |
| 5,361,153 | 11/1994 | Shimamune et al. | 359/87 |
| 5,406,398 | 4/1995 | Suzuki et al. | 359/80 |
| 5,417,257 | 5/1995 | Shimamune et al. | 141/8 |
| 5,451,292 | 9/1995 | Shimamune et al. | 216/23 |
| 5,452,114 | 9/1995 | Hotta et al. | 349/134 |
| 5,477,361 | 12/1995 | Yanagi | 349/153 |
| 5,479,284 | 12/1995 | Watanabe et al. | 359/80 |
| 5,576,865 | 11/1996 | Watanabe et al. | 349/153 |
| 5,684,556 | 11/1997 | Shimamune | 349/158 |
| 5,684,613 | 11/1997 | Taniguchi et al. | 349/155 |

FOREIGN PATENT DOCUMENTS

| | | |
|---|---|---|
| 62-299818 | 12/1987 | Japan . |
| 4-163424 | 6/1992 | Japan . |
| 5-100235 | 4/1993 | Japan . |

*Primary Examiner*—Anita Pellman Gross
*Assistant Examiner*—Tarifur R. Chowdhury
*Attorney, Agent, or Firm*—Fitzpatrick, Cella, Harper & Scinto

[57] ABSTRACT

A liquid crystal device is constituted by disposing a liquid crystal layer between a pair of oppositely disposed substrates each provide with an electrode in the form of stripes. The liquid crystal layer comprises a liquid crystal disposed in a region which is enclosed by the pair of substrates and a sealing agent disposed so as to form a peripheral wall having an injection port. The liquid crystal device has an effective optical modulation region and a peripheral region, including the injection port other than the optical modulation region. On at least one substrate, at least one elongated projection having a height smaller than a thickness of the liquid crystal layer is formed in the peripheral region including the injection port and in a direction parallel to the stripe electrode on the same substrate and perpendicular to a liquid crystal injection direction.

14 Claims, 4 Drawing Sheets

LIQUID CRYSTAL DEVICE WITH ELONGATED PROJECTION HEIGHT SMALLER THAN LIQUID CRYSTAL THICKNESS AND PROCESS FOR PRODUCING SAME

FIELD OF THE INVENTION AND RELATED ART

The present invention relates to a liquid crystal device, particularly a liquid crystal device having a cell structure capable of effecting a uniform injection of a liquid crystal, and a process for producing the liquid crystal device.

A liquid crystal device generally have a cell structure wherein a liquid crystal is sandwiched between two substrates each provided with an electrode for driving (applying a voltage to) the liquid crystal the periphery of which is sealed up with a sealing agent (adhesive). The liquid crystal is incorporated into a gap between the substrates by injection.

There has been generally performed a method of injecting a liquid crystal comprising the steps of: applying two substrates to each other with a sealing agent so as to leave an injection port for a blank cell, reducing a pressure of the interior of the blank cell (or providing a vacuum to the interior of the blank cell), applying a liquid crystal to an injection port, and restoring the (reduced) pressure of the interior of the cell to the atmospheric pressure, thus filling the interior of the cell with the liquid crystal attached to the injection port.

In this case, however, in the vicinity of the injection port, an injection (moving) speed of the liquid crystal is liable to become large, so that the liquid crystal is more liable to fail to uniformly flow or progress as a blank cell used has a larger panel size.

In order to control a flow rate of a liquid crystal, a method wherein a wall is formed by using a sealing agent in the vicinity of an injection port of a cell to change the flowing direction of a liquid crystal, thus performing uniform injection has been disclosed as in Japanese Laid-Open Patent Application (JP-A) 62-299818 and H4-163424.

Further, JP-A H5-100235 has proposed an injection method wherein a dummy pattern in parallel with an electrode pattern of pixel electrodes is formed in a region other than a region in which the pixel electrodes are formed in view of a difference in injection speed of a liquid crystal between the above two regions.

If a moving speed of a liquid crystal during the injection step is largely different depending on places within a cell, the difference causes a difference in surface state of an alignment film, thus resulting in a difference in alignment state of a liquid crystal. Further, in the case of using a chiral smectic liquid crystal (particularly a ferroelectric liquid crystal), an injection operation per se is not readily performed due to a small gap between substrates (cell gap), i.e., a thickness of a liquid crystal layer (a region occupied by a liquid crystal within a cell). In addition, since the liquid crystal finally has a layer structure within the cell, disorder of a forward end of the injected liquid crystal due to a difference in moving speed during the injection operation is liable to lead to disorder of alignment (ununiform alignment) of liquid crystal molecules in a resultant liquid crystal layer. Accordingly, in order to provide a uniform alignment leading to a good display quality, it is very important for a smectic liquid crystal (particularly a ferroelectric liquid crystal assuming chiral smectic phase) to effect uniform injection.

In a conventional liquid crystal device (cell), a flowing behavior of a liquid crystal at the time of injection operation is generally shown in FIGS. 3–6 wherein a liquid crystal cell 1 includes a liquid crystal 2 having a forward end 3, an injection port 6, a group of electrodes 8 (generally patterned in stripes) provided on one of substrates, an unfilled portion 9 (in FIG. 6), and a sealing agent 11.

Referring to the figures, on the substrate having thereon stripe electrodes 8 extending in a direction perpendicular to the liquid crystal injection direction (the upward direction on the drawings), a liquid crystal 2 flows from an injection port 6 toward an electrode 8 while having a forward end 3 in the form of an arc (FIG. 3). When the liquid crystal 2 reaches the stripe electrode 8, then the liquid crystal 2 moves along the longitudinal (length) direction of the stripe electrode 8 (FIGS. 4 and 5). As a result, an unfilled portion 9 is liable to be left in the vicinity of the injection port 6 in some cases (FIG. 6). This is because the liquid crystal 2 is liable to move (flow) along an unevenness of the electrode 8 and the sealing agent 11 due to an interfacial tension of the liquid crystal 2 therewith. Incidentally, FIGS. 3–6 only indicate a part of the liquid crystal cell 1 including the vicinity of the injection port 6 and omit the remaining part of the cell.

The unfilled portion 9 generated in the vicinity of the injection port 6 is not readily removed even by effecting a treatment of, e.g., applying a pressure during the injection step. This unfilled portion 9 causes a zigzag void 10 (as shown in FIG. 7) grown therefrom.

The above-described flowing behavior of the liquid crystal through the injection step is move noticeable in case where an interfacial tension between the liquid crystal and the inner surface of the cell at the time of injection becomes larger.

The above-described method as disclosed in JP-A 62-299818 wherein a pattern for changing the moving direction of a liquid crystal is formed by a sealing agent is liable to invite a spatial loss because the liquid crystal goes around the pattern of the sealing agent. Further, in the case of using a ferroelectric liquid crystal generally having a large viscosity, not only an injection time thereof is considerably increased but also an alignment state thereof is disordered (or impaired) in the vicinity of the pattern.

Further, in case where a similar electrode pattern in parallel with an electrode pattern in a display region (pixel region)is formed in a region other than the display region as described in JP-A H5-100235, the moving (injection) speed of a liquid crystal within a cell becomes constant, thus obviating a charge in moving speed between the display region and the remaining region at an initial stage of the injection.

In this case, however, a part of the liquid crystal contacting a sealing agent is liable to have a larger moving speed because of an interfacial tension between the part of the liquid crystal and the sealing agent, thus forming a forward end in the form of an arc both ends of which are located forward. As a result, the liquid crystal is liable to have an ununiform alignment at the remotest portion from the injection portion some cases.

SUMMARY OF THE INVENTION

An object of the present invention is to provide a liquid crystal device capable of performing uniform liquid crystal injection to allow a uniform alignment state of liquid crystal molecules over the entire cell.

Another object of the present invention is to provide a process for producing the liquid crystal device.

According to the present invention, there is provided a liquid crystal device, comprising: a pair of oppositely disposed substrates each provide with an electrode in the form of stripes, and a liquid crystal layer having a prescribed thickness and comprising a liquid crystal disposed in a region which is enclosed by the pair of substrates and a sealing agent disposed so as to form a peripheral wall having an injection port, the device having an effective optical modulation region and a peripheral region including the injection port other than the optical modulation region; wherein on at least one substrate, at least one elongated projection having a height smaller than the thickness of the liquid crystal layer is formed in the peripheral region including the injection port and in a direction parallel to the stripe electrode on the same substrate and perpendicular to a liquid crystal injection direction.

According to the present invention, there is also provided a process for producing a liquid crystal device, comprising the steps of:

providing a first substrate with an electrode in the form of stripes disposed in an effective optical modulation region and at least one elongated projection having a prescribed height disposed in parallel with the electrode and in a peripheral region other than the optical modulation region, providing a second substrate with an electrode in the form of stripes disposed at least in an effective optical modulation region, applying the first and second substrates to each other with a sealing agent disposed to leave an injection port and a gap between the substrates so that the above at least one elongated projection is located in a direction perpendicular to a liquid crystal injection direction, and injecting a liquid crystal into the gap between the substrate to form a liquid crystal layer having a thickness larger than the height of said at least one elongated projection.

By providing the above-described at least one elongated projection in the peripheral region, uniform injection can be realized since it is possible to appropriately control injection conditions of the liquid crystal, such as injection speed and injection direction.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
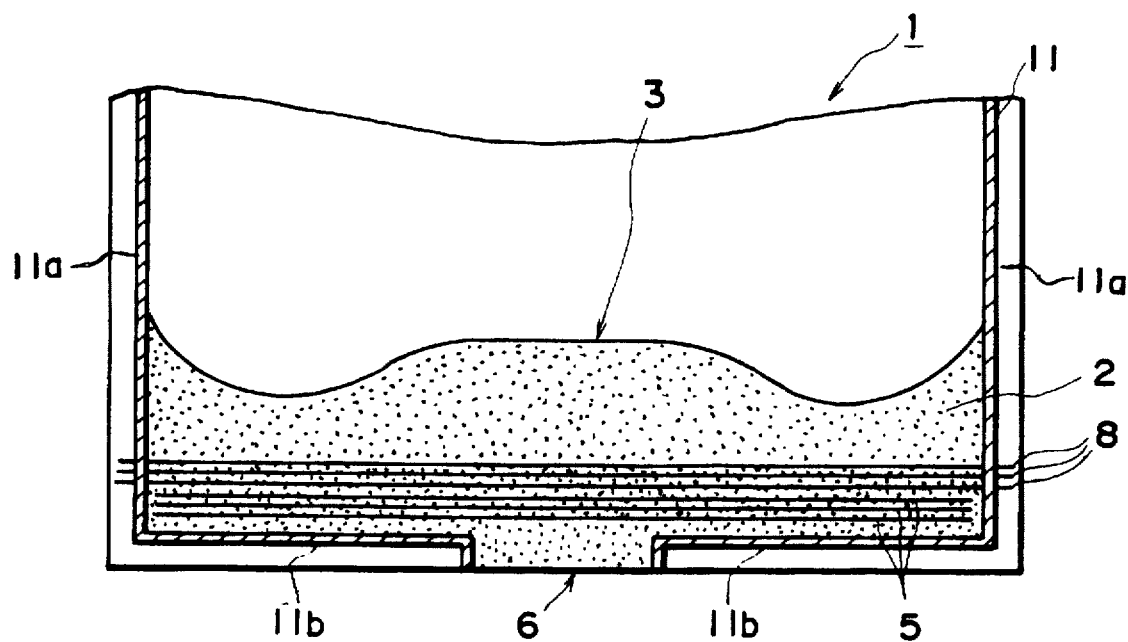
FIGS. 1 and 2 are partial plan views of liquid crystal devices according to the present invention used in Experiments 1 an 3, respectively.

The liquid crystal device according to the present invention is characterized by having at least one elongated projection disposed in a peripheral region on at least one substrate in the vicinity of an injection port (to be sealed up after injection of a liquid crystal) so that the elongated projection extends in a direction perpendicular to a liquid crystal injection direction.

Herein, the term "effective optical modulation region" means a display region having a prescribed area where a transmittance of a large number of pixels is controlled by using an applied drive signal to effect display in the case of a display device or means a region having a prescribed area in which an appropriate optical modulation is effected depending on drive signals in the case of a non-display device (a device other than the display device). Further, the term "peripheral region" means at least one region other than the effective optical modulation region and in which region the elongated projection is formed in a prescribed pattern in the vicinity of the injection port and extends in a direction perpendicular to the liquid crystal injection direction.

Further, the "peripheral region" does not substantially contribute to optical modulation (e.g., control of transmittance) and disposed outside the effective optical modulation region. The peripheral region may preferably comprise two regions opposite to each other via the effective optical modulation. The peripheral region may enclose (surround) the effective optical modulation region on all (four) sides thereof.

. The elongated projection may preferably comprise a material identical to that used in an ordinary production process of a liquid crystal device in view of simplification of the entire step, particularly the step of patterning.

Examples of such a material may include those for a color filter, a transparent electrode, a metal layer (metal wire), etc. The material may preferably be those for the transparent electrode, such as indium tin oxide (ITO).

The elongated projection may preferably be plural elongated projections patternized in parallel with each other. Each of the elongated projections has a height (H) (i.e., a length (thickness) in a direction of the normal with respect to the substrate surface) smaller than a thickness of the liquid crystal layer (i.e., a cell gap between the pair of substrates having thereon appropriate structural members) controlled and defined by a spacer. If the elongated projection has a too large height, the moving speed of the liquid crystal in a direction perpendicular to the liquid crystal injection direction also becomes too large, thus failing to sufficiently inject the liquid crystal into a space between respective stripe electrodes formed on the opposite substrate having a pattern in a parallel with the liquid crystal injection direction in some cases. For this reason, each of the elongated projections may preferably have a height (H) which is $1/10$ to $1/100$ of the cell gap (thickness of liquid crystal layer). More specifically, when a cell gap is set to about 0.5–2.5 μm as in the case of a ferroelectric (chiral smectic) liquid crystal panel, the elongated projection may preferably have a height of 200–1000 Å. In case where a larger cell gap is provided, the elongated projection may comprise plural layers including, e.g., an ITO film(thickness: 200–1000 Å) and a metal layer (thickness: 500–2000 Å) for coating the ITO film and lowering a resistance thereof, thus allowing an appropriate control of the height of the elongated projection.

In the present invention, the plural elongated projections may preferably be adopted as described above. Each of the plural elongated projections may preferably have a length (L) shorter than a distance between side peripheral walls (as shown by reference numeral 11a in FIG. 1) in the longitudinal direction of the elongated projection. In other words, the elongated projection is disposed inside the (side) peripheral walls. If the elongated projection has a length equal to or larger than the distance between the side peripheral walls as described above (e.g., has a length equal to that of the electrode 8 (as shown in FIG. 1)), the forward end of the injected liquid crystal is liable to go forward at the boundary between the liquid crystal and in the peripheral wall (sealing agent) due to an interfacial tension therebetween.

Figure 2:
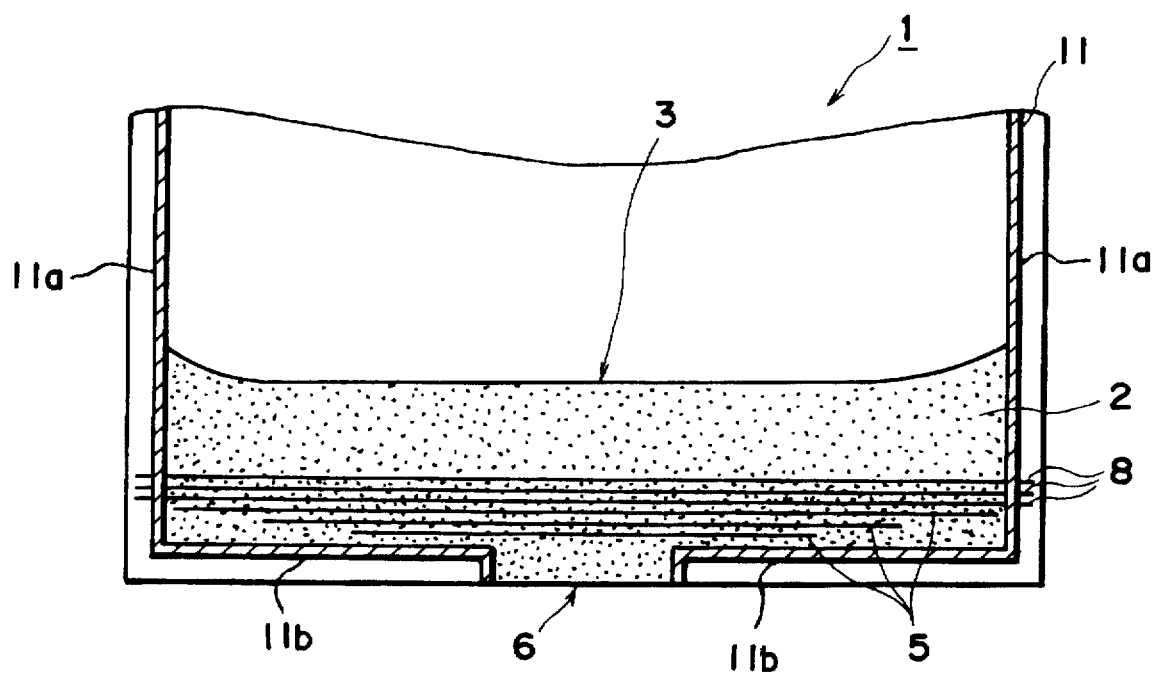
Figure 3:
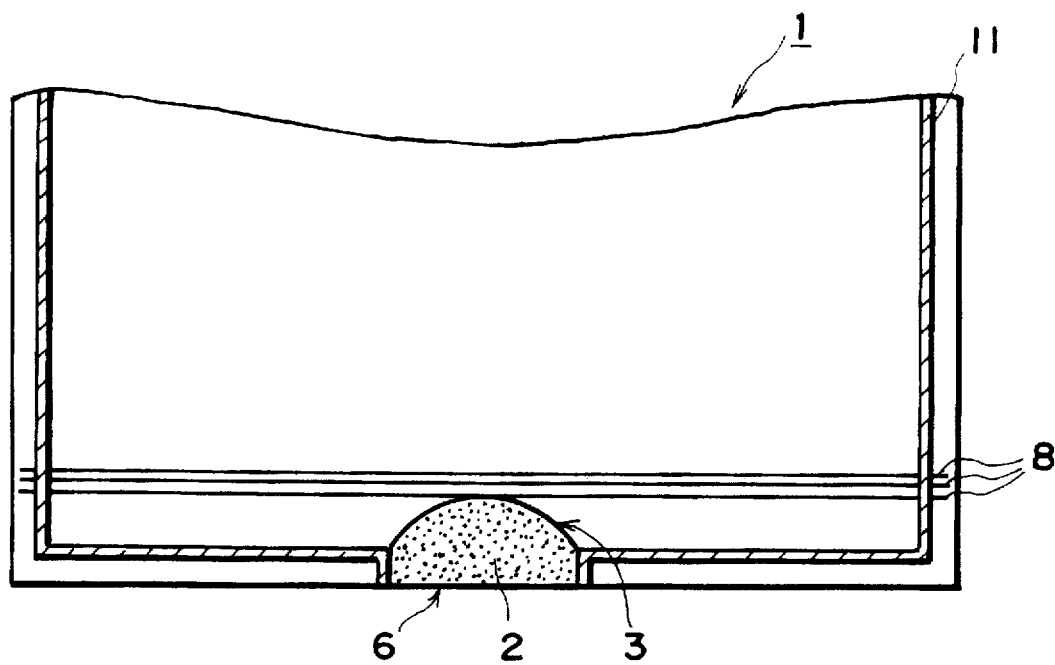
FIGS. 3–6 are partial plan views of a liquid crystal device for illustrating a flowing behavior of liquid crystal during an injection step, respectively.
Figure 4:
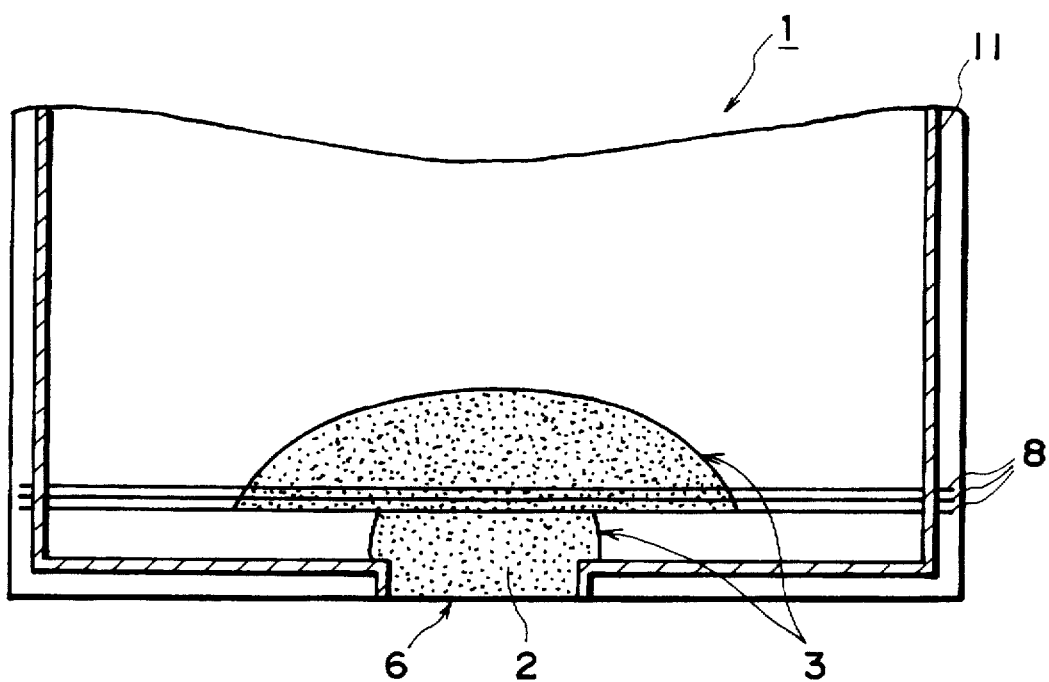
Figure 5:
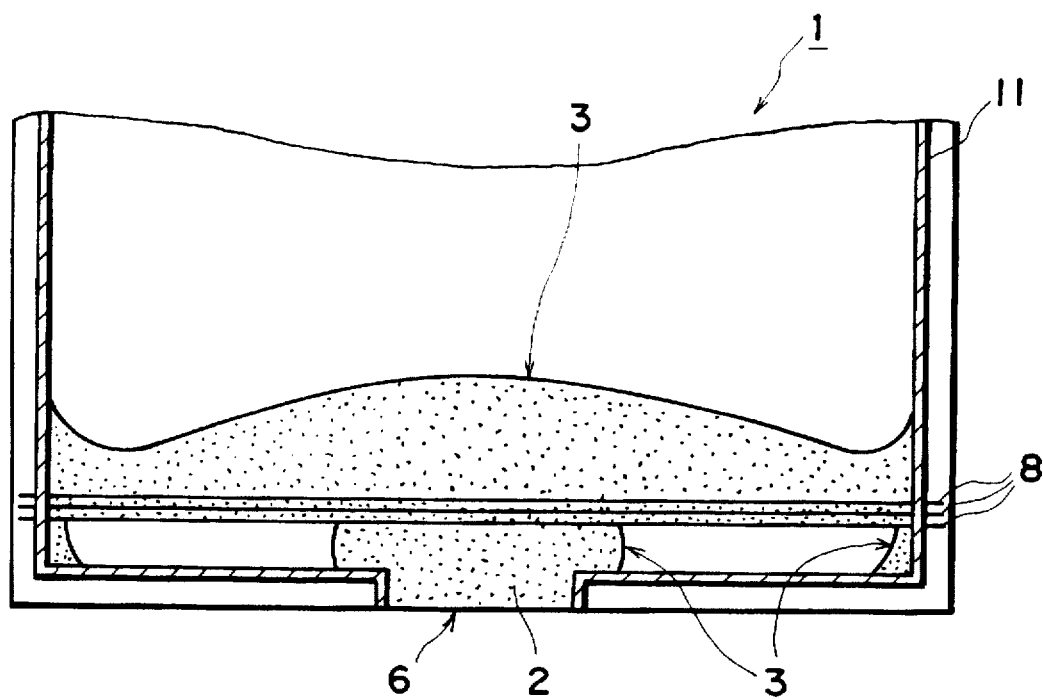
Figure 6:
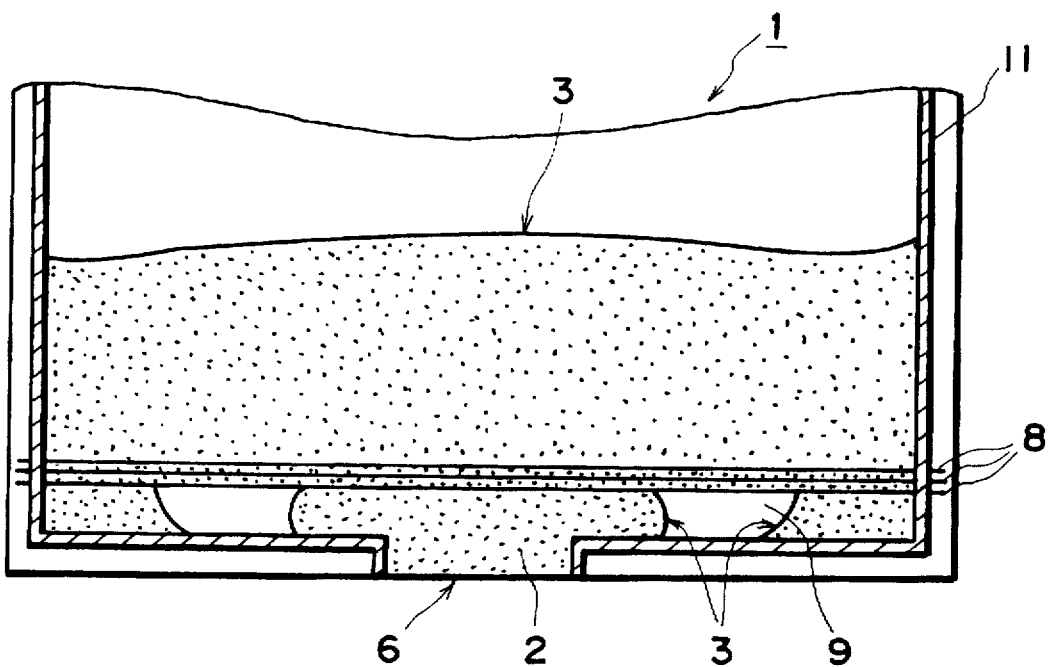

Accordingly, the plural elongated projections may more preferably have different lengths which gradually increase from on the injection port side toward the closest stripe electrode 8 (as shown in FIG. 2) disposed in the effective optical modulation region (display region).

In the present invention, respective lengths of the plural elongated projections may be determined as follows.

A base line in parallel with the liquid crystal injection direction is taken at one end of the injection port. In case where three elongated projections comprising a first projection (closer to the injection port) having a partial length $l_1$ from the base line, a second projection having a partial length $l_2$ from the base line, and a third projection (closer to the ITO electrode (8 as shown in FIG. 2) having a partial length $l_3$ are provided, the length $l_2$ is set to have a length shorter than the length $l_3$ by $1/n$ of the length $l_3$ (n may preferably be 3 in this case) and the length $l_1$ is set to have a length shorter than the length $l_3$ by $2/n$ (preferably ⅔) of the length $l_3$. In other words, the lengths $l_1$, $l_2$ and $l_3$ may preferably have a proportion ($l_1:l_2:l_3$) of $1/n:2/n:3/n$ (n may preferably be equal to the number of projections). On the other side, the same relationship of respective partial length as in the above side holds.

In another preferred embodiment, each of the above-mentioned first to third projection having different lengths may be a group of plural projections (preferably 2–5 projections), i.e., each of the projections constituting a certain group (e.g., as the first projection) has an identical length but has a different length from that of other groups (e.g., as the second and third projections).

Each of the elongated projections may be appropriately designed to have prescribed width (W) and spacing (S) for providing suitable, injection conditions (e.g., injection direction, injection speed, etc.) in view of, e.g., physical properties of a liquid crystal and interfacial tensions between a liquid crystal and an alignment film or between a liquid crystal and a sealing agent.

In the present invention, the width (W) of the elongated projection may be equal to that of the transparent electrode (as a drive electrode) and generally be 10 μm to several hundred microns. The spacing (S) of the elongated projection may generally be 3–20 times larger than that of the adjacent transparent electrodes.

In the present invention, a color filter may be formed on either substrate.

The liquid crystal to be injected into a blank cell may be any known liquid crystals but may preferably be a chiral smectic liquid crystal, such as a ferroelectric chiral smectic liquid crystal. The chiral smectic liquid crystal may preferably has a phase transition series including isotropic phase, cholesteric phase, smectic A phase and chiral smectic phase on temperature decrease.

Figure 7:
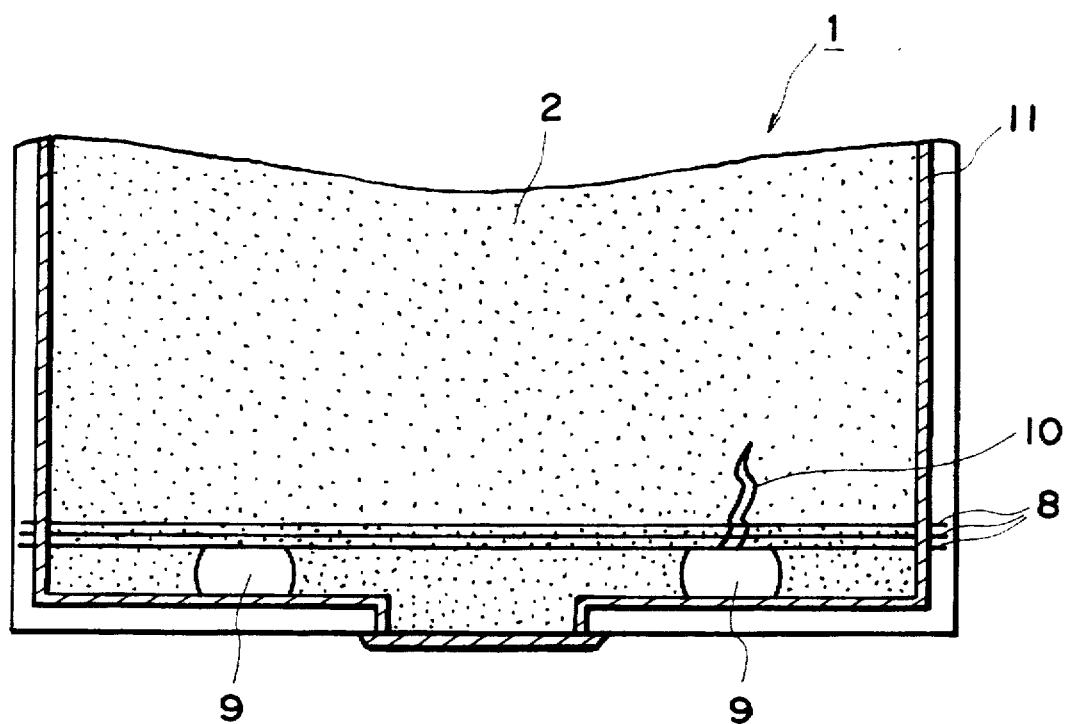
FIG. 7 is a partial plan view of a liquid crystal device for illustrating defects (voids) after injection operation.

After a liquid crystal material is injected into a blank cell under heating, if the liquid crystal material is cooled at room temperature by leaving it standing for a long time, voids (unfilled portions) are liable to be occurred in the vicinity of a peripheral wall of a sealing agent in some cases. Such voids are liable to grow toward a display region at which defects (e.g., zigzag defects) are generated in some cases as shown in FIG. 7.

In the present invention, the elongated projection is effective in preventing occurrence of such voids leading to zigzag defects in the display region because of its function of controlling speed and direction of the liquid crystal injection.

Hereinbelow, the present invention will be described more specifically based on Experiments with reference to FIGS. 1 and 2 wherein identical structural members (elements) are indicated by identical reference numerals shown in FIGS. 1–6 described hereinabove.

Experiment 1

FIG. 1 shows a liquid crystal device 1 prepared and used in this embodiment wherein plural elongated projections comprise parallel three ITO films (layers) each having an identical length.

A pair of treated substrates were prepared as follows.

On one of a pair of substrates, a group of transparent electrodes 8 (ITO; thickness=700 Å) in the form of stripes and plural ITO stripe films 5 (height (thickness)=700 Å) as elongated projections, having a pattern (such that each of the projections had a length of 220 mm, a width of c.a. 0.8 mm, a spacing therebetween of c.a. 1 mm, a spacing between the lower (or upper) projection and the peripheral wall 11b (or the closer electrode 8) of 3 mm) were formed at the same time in a display region and a peripheral region (inside and in the vicinity of an injection port to be formed hereinafter), respectively, as shown in FIG. 1. Each of the ITO stripe films 5 had an identical length which was shorter than that of the transparent electrodes 8 and corresponded to a length shorter than a distance between side walls 11a of a peripheral wall 11.

The stripe transparent electrodes 8 were respectively coated with a metal layer (Al; thickness =10000 Å). The stripe transparent electrodes 8 and the ITO stripe films 5 (which was not coated with the metal layer) were then coated with an insulating layer ($Ta_2O_5$; thickness=c.a. 0.1 μm) for preventing short-circuit and an alignment film (polyimide; thickness=200 Å), respectively, followed by rubbing of the alignment film.

The other treated substrate was prepared in the same manner as in the above substrate except that the plural ITO stripe films 5 (as elongated projections) were not used.

On one side of the treated substrate, a sealing agent 11 was disposed in the form as shown in FIG. 1 and spacer beads (diameter=1.1 μm) for holding a prescribed cell gap (about 1.1 μm) were dispersed. The resultant treated substrate was applied to the other treated substrate each other so that the stripes of the electrode groups 8 formed on the respective substrates intersected with each other to form a lot of display pixels and that the ITO stripe films 5 were disposed closer to an injection port 6 from which a liquid crystal was injected, thus forming a blank cell.

In a vacuum chamber, the blank cell was reduced in pressure to provide a vacuum state and a ferroelectric liquid crystal 2 showing a phase transition of isotropic phase—cholesteric phase—smectic A phase—chiral smectic phase on temperature decrease was attached to the injection port 6 of the blank cell. When the blank cell was taken out from the vacuum chamber in a state that the liquid crystal 2 was attached to the injection port 6, the liquid crystal 2 was injected into a gap between the two treated substrates. The injection operation was performed under heating sufficient to provide the liquid crystal with an isotropic state in which the liquid crystal had a low viscosity and readily flowed.

The injected liquid crystal 2 was moved in longitudinal direction(length direction of ITO stripe films 5) in the peripheral region and showed a somewhat higher injection (moving) speed in the vicinity of the peripheral wall 11a but retained a uniform injection state, thus leaving no unfilled portion (void) in the vicinity of the injection port 6. At the remotest portion from the injection port 6, a slightly disordered alignment state was observed because of the higher injection speed along the peripheral wall 11a but was practically acceptable level.

After sealing up the injection port 6, a resultant liquid crystal panel (liquid crystal device) was left standing for a long time, whereby a void (defect) which was considered to occur due to a difference in expansion coefficient (expansivity) between the liquid crystal and the cell was grown from on the injection port side. However, the void terminated its growth (movement) at a position in which the ITO stripe films 5 were located (in the peripheral region) and did not enter the display region where the display pixels were located.

Experiment 2

A liquid crystal device (panel) was prepared and evaluated in the same manner as in Experiment 1 except that the ITO stripe films 5 (as elongated projections) were not formed.

As a result of the injection operation, a liquid crystal had a higher injection (moving) speed at the central portion and at both terminal potions of a forward end thereof and caused an unfilled portion in contact with a peripheral wall (corr. to 11b in FIG. 1). Further, after sealing an injection port and cooling a resultant cell, the unfilled portion was found to grow into a zigzag defect extending in the display area.

Further, the liquid crystal panel was left standing for a long time, whereby another void due to a difference in expansivity between the liquid crystal and the cell was generated and entered the display region.

Experiment 3

FIG. 2 shows a liquid crystal device 1 prepared and used in this experiment wherein plural elongated projections comprises parallel three ITO films (layers) having different lengths (220 mm, 180 mm, 140 mm), respectively.

A liquid crystal device was prepared and evaluated in the same manner as in Experiment 1 except that plural ITO stripe films 5 had a pattern as shown in FIG. 2 wherein each of the stripe films had different length which were shorter than a distance between two sides walls 11a of the peripheral wall 11 and gradually increased from on the injection port 6 side toward on the display region side having the transparent electrode 8 and that a treated substrate free from ITO stripe films 5 (elongated projections) was provided with a color filter and a coating layer thereof under the transparent electrodes in the following manner.

On a substrate, a color filter comprising color filter segments of red (R), green (G) and blue (B) was formed. Then, a coating layer for flattening the surface level and gaps between the respective color segments was formed on the color filter.

Compared with Experiment 1, a forward end of the injected liquid crystal was closer to a linear (uniform) form because of the presence of plural elongated projections having different lengths more effective in appropriately controlling speed and direction of the injected liquid crystal, thus resulting in uniform injection.

When a state of alignment over the entire panel was observed, no alignment disorder was confirmed even at the remotest portion from the injection port 6.

Experiment 4

A liquid crystal device was prepared and evaluated in the same manner as in Experiment 3 except that plural ITO stripe films 5 (as elongated projections) were coated with a metal layer (Al; thickness=1000 Å).

When a liquid crystal was injected, the liquid crystal had a larger injection speed in a direction perpendicular to the liquid crystal injection direction compared with that in the liquid crystal injection direction. As a result, in the vicinity of the electrode pattern on the opposite substrate (free from elongated projections) located in a region closer to the injection port, alignment disorder (ununiform alignment) attributable to a too high injection speed was observed. Further, at the remotest portion from the injection port, another alignment disorder attributable to ununiform injection toward the remotest portion.

As described hereinabove, according to the present invention, there is provided a liquid crystal device capable of allowing uniform injection of a liquid crystal by providing at least one elongated projection in a prescribed pattern effective in controlling an injection speed and an injection direction to at least one substrate without inviting an increase in injection time. As a result, it is possible to provide a liquid crystal display panel free from a zigzag defect and alignment failure by suppressing occurrence of an unfilled portion and alignment disorder.

Further, the presence of the above elongated projection(s) is effective in preventing growth (movement) of a void (defect), due to an expansivity difference between materials used, caused by leaving a liquid crystal panel standing for a long time after the injection, thus suppressing movement of the void into the display region. This effect is more advantageously attained in case of using two or more elongated projections.

What is claimed is:

1. A liquid crystal device, comprising: a pair of oppositely disposed substrates each provide with electrodes in the form of stripes, and a liquid crystal layer having a prescribed thickness and comprising liquid crystal disposed in a region which is enclosed by the pair of substrates and a sealing agent disposed so as to form a peripheral wall having an injection port, the device having an effective optical modulation region, and a peripheral region other than the effective optical modulation region and including the injection port; wherein on at least one substrate, at least one elongated projection having a height smaller than the thickness of the liquid crystal layer is formed in the peripheral region including the injection port and in a direction parallel to the striped electrodes on the same substrate and perpendicular to a liquid crystal injection direction.

2. A device according to claim 1, wherein the effective optical modulation region constitutes a display region and the striped electrodes constitute display electrodes.

3. A device according to claim 1 wherein said at least one elongated projection has a height which is at most one-tenth of the thickness of the liquid crystal layer.

4. A device according to claim 1, wherein said at least one elongated projection comprises plural elongated projections parallel to each other.

5. A device according to claim 4, wherein said plural elongated projections are disposed inside the peripheral wall.

6. A device according to claim 4, wherein said plural elongated projections have different lengths gradually increasing in the liquid crystal injection direction toward the effective optical modulation region.

7. A device according to claim 1, wherein said at least one elongated projection comprises a material identical to that of the electrodes.

8. A device according to claim 7, wherein the material comprises an indium tin oxide.

9. A device according to any one of claims 1–8, wherein said liquid crystal layer has a thickness of 0.5–2.5 μm and said at least one elongated projection has a height of 200–1000 Å.

10. A device according to claim 9, wherein said liquid crystal layer comprises a chiral smectic liquid crystal material.

11. A process for producing a liquid crystal device, comprising the steps of:

providing a first substrate with electrodes in the form of stripes disposed in an effective optical modulation region and at least one elongated projection having a prescribed height disposed in parallel with the electrodes and in a peripheral region other than the effective optical modulation region, providing a second substrate with electrodes in the form of stripes disposed at least in the effective optical modulation region, applying the first and second substrates to each other with a sealing agent disposed to leave an injection port and a gap between the substrates so that said at least one elongated projection is located in a direction perpendicular to a liquid crystal injection direction, and injecting a liquid crystal into the gap between the substrates to form a liquid crystal layer having a thickness larger than the height of said at least one elongated projection.

12. A process according to claim 11, wherein said at least one elongated projection comprises plural elongated projections parallel to each other having different lengths which gradually increase in the liquid crystal injection direction toward the effective optical modulation region.

13. A process according to claim 11, wherein said at least one elongated projection has a height which is at most one-tenth of the thickness of the liquid crystal layer.

14. A process according to claim 11, wherein said at least one elongated projection comprises a material identical to that of the electrodes.

* * * * *

UNITED STATES PATENT AND TRADEMARK OFFICE
CERTIFICATE OF CORRECTION

PATENT NO. : 5,751,391

DATED : May 12, 1998

INVENTOR(S) : YUKO YOKOYAMA, ET AL.

It is certified that error appears in the above-identified patent and that said Letters Patent is hereby corrected as shown below:

COLUMN 1

Line 59, "ununiform" should read --non-uniform--.

COLUMN 2

Line 28, "move" should read --more--;
Line 43, "region)is" should read --region) is--;
Line 56, "ununiform" should read --non-uniform--; and
Line 57, "some cases." should read --in some cases.--.

COLUMN 3

Line 1, "provide" should read --provided--; and
Line 51, "an" should read --and--.

COLUMN 4

Line 44, "a" should be deleted; and
Line 53, "film(thickness:" should read
--film (thickness:--.

COLUMN 5

Line 19, "12" should read --$1_2$--;
Line 29, "projection" should read --projections--;
Line 54, "has" should read --have--; and
Line 60, "to be occurred" should read --to occur--.

COLUMN 6

Line 45, "each" should read --opposing each--.

UNITED STATES PATENT AND TRADEMARK OFFICE
CERTIFICATE OF CORRECTION

PATENT NO. : 5,751,391
DATED : May 12, 1998
INVENTOR(S) : YUKO YOKOYAMA, ET AL.

Page 2 of 2

It is certified that error appears in the above-identified patent and that said Letters Patent is hereby corrected as shown below:

COLUMN 7

Line 5, "practically" should read --practically at an--.

COLUMN 8

Line 5, "(ununiform" should read --(non-uniform--;
    Line 8, "ununiform" should read --non-uniform--;
    Line 29, "provide" should read --provided--;
    Line 31, "comprising" should read --comprising a--; and
    Line 48, "claim 1" should read --claim 1,--.

Signed and Sealed this

Sixteenth Day of March, 1999

Attest:

Q. TODD DICKINSON

*Attesting Officer*

*Acting Commissioner of Patents and Trademarks*